(12) United States Patent
Meyers

(10) Patent No.: US 8,980,494 B2
(45) Date of Patent: Mar. 17, 2015

(54) WATER MANAGEMENT FOR A FUEL CELL

(75) Inventor: Jeremy P. Meyers, West Hartford, CT (US)

(73) Assignee: Ballard Power Systems Inc., Burnaby (CA)

( * ) Notice: Subject to any disclaimer, the term of this patent is extended or adjusted under 35 U.S.C. 154(b) by 1238 days.

(21) Appl. No.: 12/301,526

(22) PCT Filed: Jul. 25, 2006

(86) PCT No.: PCT/US2006/028782
§ 371 (c)(1),
(2), (4) Date: Nov. 19, 2008

(87) PCT Pub. No.: WO2008/013523
PCT Pub. Date: Jan. 31, 2008

(65) Prior Publication Data
US 2009/0155636 A1  Jun. 18, 2009

(51) Int. Cl.
*H01M 8/00* (2006.01)
*H01M 2/02* (2006.01)
*H01M 8/04* (2006.01)
*H01M 8/10* (2006.01)

(52) U.S. Cl.
CPC ...... *H01M 8/04126* (2013.01); *H01M 8/04179* (2013.01); *H01M 2008/1095* (2013.01); *Y02E 60/50* (2013.01)
USPC .......... 429/438; 429/408; 429/414; 429/437; 429/444; 429/447; 429/450; 429/456; 429/457; 429/514

(58) Field of Classification Search
None
See application file for complete search history.

(56) References Cited

U.S. PATENT DOCUMENTS

| | | |
|---|---|---|
| 5,503,944 A | 4/1996 | Meyer et al. |
| 5,853,909 A | 12/1998 | Reiser |
| 6,794,077 B2 | 9/2004 | Yi et al. |
| 2004/0110049 A1 | 6/2004 | Shimotori et al. |
| 2004/0170878 A1* | 9/2004 | Goebel .......................... 429/26 |
| 2005/0064261 A1 | 3/2005 | Breault et al. |
| 2005/0106434 A1* | 5/2005 | Shimotori et al. .............. 429/26 |
| 2005/0142408 A1 | 6/2005 | Breault |
| 2006/0141330 A1 | 6/2006 | Reiser et al. |
| 2009/0011288 A1* | 1/2009 | Perry et al. ...................... 429/13 |

OTHER PUBLICATIONS

European Search Report for EP Application No. 06788381.9, Sep. 30, 2009.
Search Report and Written Opinion mailed on Jan. 10, 2007 for PCT/US06/28782.

* cited by examiner

*Primary Examiner* — Alix Eggerding
(74) *Attorney, Agent, or Firm* — Seed IP Law Group PLLC

(57) ABSTRACT

A fuel cell is provided that includes a water transport plate separating an air flow field and a water flow field. The driving force for moving water across the water transport plate into the water flow field is produced by a differential pressure across a restriction. The restriction is arranged between an air outlet of the cathode water transport plate and a head of a reservoir that is in fluid communication with the water flow field.

13 Claims, 1 Drawing Sheet

WATER MANAGEMENT FOR A FUEL CELL

BACKGROUND OF THE INVENTION

This invention relates to managing the water flow within a fuel cell, and more particularly, managing the differential pressure across a water transport plate to insure desired water flow across the water transport plate.

Water transport plates are porous separator plates used on both the cathode and anode side of an electrode in a fuel cell. By selecting proper pore sizes within the porous plate, liquid transport occurs but gas transport is prevented. Liquid transport permits membrane hydration and enables removal of product water on the cathode side resulting from the electrochemical reaction within the fuel cell. Preventing gas transport inhibits the fuel and oxidant gases from commingling.

The water transport plates are exposed to water flow fields to maintain desired operation of the fuel cell. In local regions of the cell in which the reactant gas is flowing from a region of low temperature to higher temperature, water evaporates off the porous plate to saturate the gas stream with water vapor; in regions where the reactant gas is moving from higher temperature to lower temperature, product water that is formed in the electrochemical reaction and liquid water that condenses out of the cooling gas stream must be recaptured by the porous plate. In either case, there must be a driving force to move the water through the pores of the water transport plate from the gas flow field side to the water flow field side to remove product water.

Many fuel cell systems use external circulating water cooling loops that add weight and are subject to freezing in cold weather conditions. In some configurations, the external water cooling loop is connected to a diaphragm and is used to provide the driving force to move water across the water transport plate. An air inlet pressure also acts on the diaphragms. It is desirable to limit the amount of water used in a fuel cell to reduce concerns relating to draining, pumping, freezing and thawing the water. As a result, there has been an effort to eliminate the external water cooling loop. What is needed is a driving force across the water transport plate without using pumps or complex valves in a fuel cell without an external water cooling loop.

SUMMARY OF THE INVENTION

A fuel cell arrangement includes a water transport plate separating air and water flow fields. The air flow field includes an air inlet and an air outlet. A coupling fluidly connects the air outlet to the water flow field. The fuel cell may include a reservoir having a head. The coupling fluidly connects the air outlet to the head, in one example. A restriction is arranged between the air outlet and the head. The restriction includes a high pressure side provided by the air outlet and a low pressure side exposed to the head. The low pressure side is at a lower pressure than the high pressure side. As a result, a differential pressure is created across the cathode water transport plate that provides a driving force which moves water from the air flow field side to the water flow field side of the water transport plate. The restriction is provided by an orifice in one example. In this manner, a simple arrangement is provided to create a driving force that removes product water from the cathode water transport plate.

DETAILED DESCRIPTION OF THE PREFERRED EMBODIMENT

Figure 1:
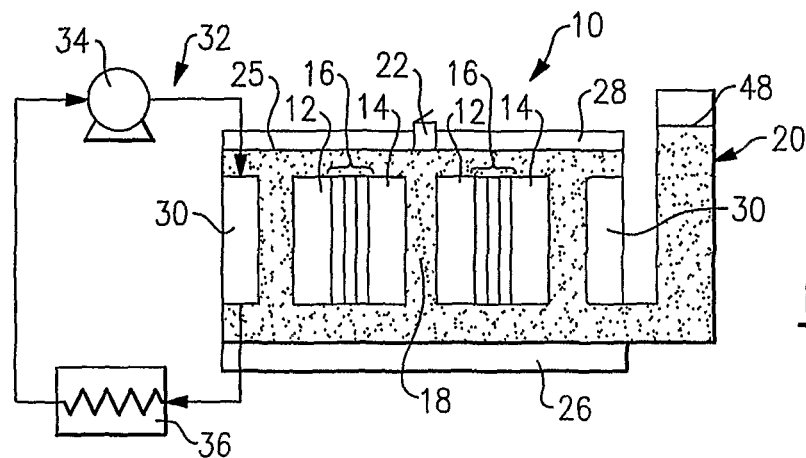
FIG. 1 is a schematic view of a fuel cell arrangement including an external coolant loop and a water reservoir.

FIG. 1 schematically illustrates a fuel cell 10 that includes an anode water transport plate 12 and a cathode water transport plate 14. An electrode assembly 16 separates the anode and cathode water transport plates 12, 14. A water flow field 18 is arranged on a back side of the anode and cathode water transport plates, 12, 14. The water flow field 18 hydrates the anode and cathode water transport plate 12, 14 to provide desired performance. The cathode water transport plate 14 moves product water from an air flow field into the water flow field 18 in response to a driving force to prevent flooding.

Figures 2, 4:
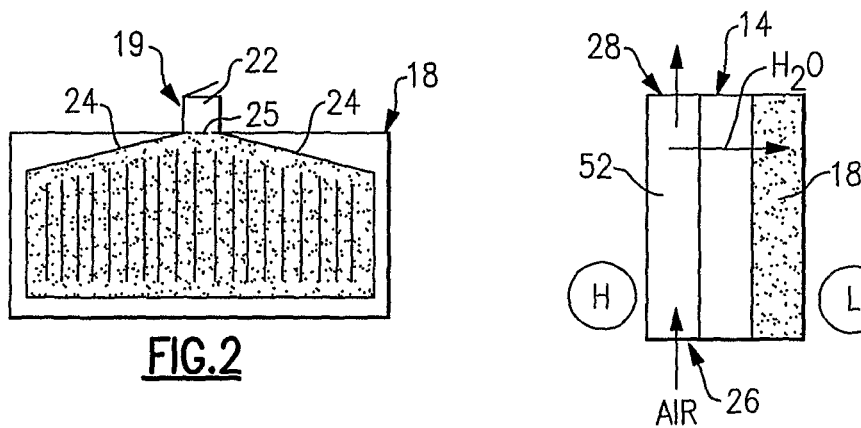
FIG. 2 is a schematic view of a water flow field with a vent.
FIG. 4 is a schematic view of a cathode water transport plate for the fuel cell shown in FIG. 3.

Referring to FIG. 2, an example water flow field 18 is illustrated. The water flow field 18 may be provided by channels cut in the back sides of the anode and cathode water transport plates 12, 14. The water flow field 18 may be defined by inclined walls 24 that lead to a vent 22 in a water flow field manifold 19 to permit gases entrained within the water to escape the fuel cell through the vent 22.

The example fuel cell 10 includes cooling plates 30 that are solid and include coolant passages for carrying a coolant such as glycol. The cooling plates 30 are in fluid communication with a cooling loop 32, which includes a pump 34 for circulating the coolant to a heat exchanger 36 for removing heat from the fuel cell 10. The cooling loop 32 does not carry water in the example. However, the present invention is still applicable to fuel cells that use water cooling loops.

Returning to FIG. 1, the fuel cell 10 includes a water reservoir 20 that has a water fill line 48 above a water level 25 in the fuel cell 10 to insure that the anode and cathode water transport plates 12, 14 are exposed to an adequate level of water.

Figures 3, 5:
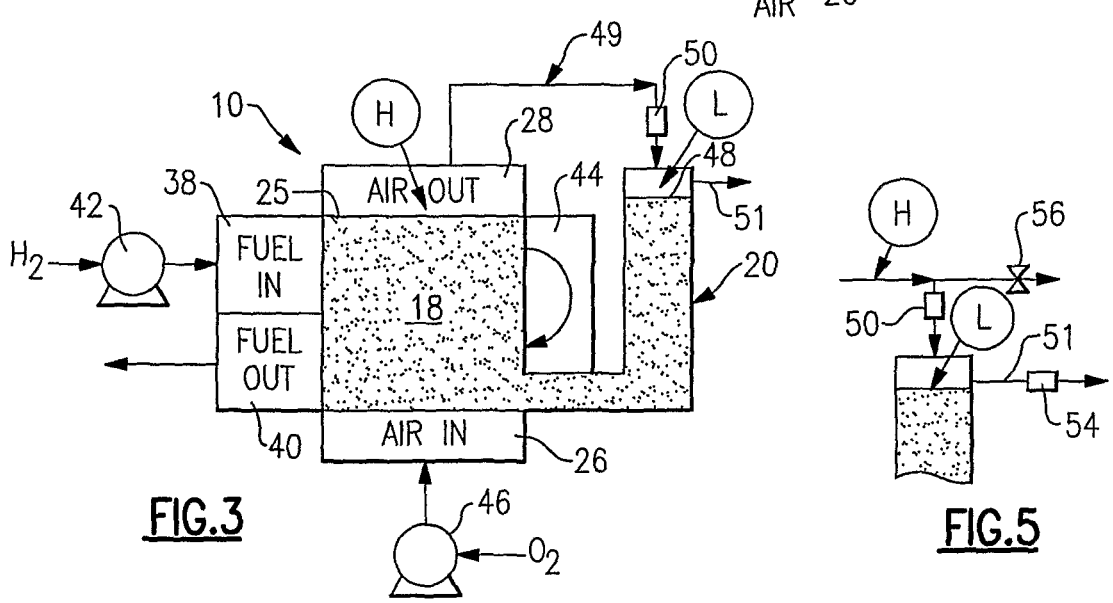
FIG. 3 is a schematic view of a fuel cell having an air outlet of an air flow field coupled to a head of the reservoir.
FIG. 5 is a schematic view of a vent and drain associated with the water reservoir.

Referring to FIGS. 1 and 3, the fuel cell 10 includes an air inlet manifold 26 that receives air from a blower 46. The air inlet manifold 26 provides air to an inlet side of the cathode water transport plate 14 at the air flow field 52. The air exits the air flow field 52 through an air outlet manifold 28. The fuel cell 10 includes a fuel inlet manifold 38 that receives fuel from a pump 42. The fuel passes through a fuel flow field in the anode water transport plate 12 and passes through a manifold 44, returning to a fuel outlet manifold 40.

In order to provide the driving force that removes the product water generated at the air flow field 52 to the water flow field 18, the air outlet side of the air flow field 52 is coupled to the head of the water reservoir 20 with a coupling 49. A restriction 50, for example an orifice, is arranged between the air outlet of the cathode water transport plate 14 and the head of the water reservoir 20. The restriction 50 creates a high pressure side H on the air outlet side and a low pressure side L at the head of the water reservoir 20. The effect of the restriction 50 on the cathode water transport plate 14 is illustrated in FIG. 4. The high pressure side H is associated with the air flow field 52 and the low pressure side L is associated with the water flow field 18 creating a differential pressure that provides the driving force to move the product water across the cathode water transport plate 14 into the water flow field 18.

Referring to FIG. 5, a water drain 51 is shown in communication with the water reservoir 20 to permit water to drain from the water reservoir 20 as product water accumulates within the fuel cell 10. The water drain 51 may include a check valve 54. The coupling 49 may include a back pressure valve 56 upstream of the restriction 50 to prevent the differential pressure from becoming greater than desired. The back pressure valve 56 is exposed to ambient air in the example shown.

The air outlet can also be coupled with a humidification loop for fuel cells utilizing a circulating water cooling loop. The vapor interface from the water loop can be coupled to the water reservoir 20, similar to the arrangement illustrated in FIG. 3.

The invention has been described in an illustrative manner, and it is to be understood that the terminology that has been used is intended to be in the nature of words of description rather than of limitation. Obviously, many modifications and variations of the present invention are possible in light of the above teachings. It is, therefore, to be understood that within the scope of the appended claims the invention may be practiced otherwise than as specifically described.

The invention claimed is:

1. A fuel cell arrangement comprising:
air and water flow fields, the air flow field having an air inlet manifold providing an air inlet and an air outlet manifold providing an air outlet;
a coupling having a restriction that is downstream from the air outlet and outside the water flow field, the restriction fluidly arranged between and connecting the air outlet to the water flow field, the restriction having a high pressure side provided by the air outlet and a low pressure side exposed to the water flow field, the low pressure side at a lower pressure than the high pressure side; and
a reservoir in fluid communication with the water flow field, the water flow field having a water level and the reservoir having a fill line above the water level, the reservoir includes a head corresponding to the fill line that is on the low pressure side and in fluid communication with and exposed to the restriction, the reservoir includes a water drain at or above the fill line, and a valve arranged in the water drain configured to maintain the reservoir at the lower pressure.

2. The fuel cell according to claim 1, wherein the air and water flow fields are separated by a cathode water transport plate.

3. The fuel cell according to claim 2, comprising a blower providing air to the air inlet, the air outlet on an opposite side of the cathode than the air inlet.

4. The fuel cell according to claim 1, wherein the water flow field includes a vent in communication with the water level for permitting gas in the water flow field to escape.

5. The fuel cell according to claim 1, comprising a back pressure valve in communication with the head and exposed to the low pressure side and ambient air on a side of the restriction opposite the valve.

6. The fuel cell according to claim 1, wherein the restriction is an orifice.

7. The fuel cell according to claim 1, wherein the valve is a check valve.

8. A method of managing water within a fuel cell, wherein the fuel cell includes a reservoir in fluid communication with a water flow field, the water flow field having a water level and the reservoir having a fill line above the water level, the reservoir includes a head corresponding to the fill line that is on the low pressure side and in fluid communication with and exposed to a restriction, the reservoir includes a water drain at or above the fill line, the method comprising the steps of:
separating an air flow field and the water flow field with a plate, at least a portion of which is porous;
moving air through the air flow field to an air outlet of an air outlet manifold at a first pressure;
restricting the air with the restriction at a location downstream from the air outlet and outside of the water flow field to produce a second pressure less than the first pressure; and
exposing the water flow field to the second pressure, and maintaining the second pressure in the reservoir with a valve in the water drain.

9. The method according to claim 8, wherein the plate is a cathode water transport plate.

10. The method according to claim 9, wherein the air is provided by the air outlet in the air flow field of the cathode.

11. The method according to claim 8, wherein step of restricting the air to produce a second pressure less than the first pressure is performed by passing the air through an orifice.

12. The method according to claim 8, wherein the water flow field fluidly communicates with a water reservoir having a head, and step of exposing the water flow field to the second pressure includes exposing the head to the second pressure.

13. The method according to claim 8, wherein the valve is a check valve.

* * * * *